US005604610A

United States Patent [19]
Spaulding et al.

[11] Patent Number: 5,604,610
[45] Date of Patent: Feb. 18, 1997

[54] TRANSFORMING COLOR SIGNAL VALUES FOR USE BY A PARTICULAR DEVICE

[75] Inventors: Kevin E. Spaulding; James R. Sullivan, both of Spencerport, N.Y.

[73] Assignee: Eastman Kodak Company, Rochester, N.Y.

[21] Appl. No.: 333,828

[22] Filed: Nov. 3, 1994

[51] Int. Cl.⁶ .................................. H04N 1/46; G03F 3/08
[52] U.S. Cl. ......................... 358/525; 358/523; 382/167; 382/302
[58] Field of Search ...................... 358/578, 500, 358/501, 504, 523, 525, 537, 448, 452, 524, 428; 382/302, 304, 276, 274, 167, 162, 277; 395/162, 109; 345/904, 153, 154; 347/43

[56] References Cited

U.S. PATENT DOCUMENTS

| | | | |
|---|---|---|---|
| 4,979,032 | 12/1990 | Alessi et al. ............................. | 358/76 |
| 4,989,079 | 1/1991 | Ito .............................................. | 358/80 |
| 5,065,229 | 11/1991 | Tsai et al. ............................... | 358/21 R |
| 5,185,661 | 2/1993 | Ng ............................................ | 358/75 |
| 5,282,046 | 1/1994 | Yamaguchi .............................. | 358/296 |
| 5,321,797 | 6/1994 | Morton .................................... | 395/131 |
| 5,412,491 | 5/1995 | Bachar ..................................... | 358/500 |
| 5,420,979 | 5/1995 | Madden et al. ......................... | 395/162 |
| 5,432,906 | 7/1995 | Newman et al. ........................ | 395/162 |
| 5,448,377 | 9/1995 | Kinoshita ................................ | 358/452 |
| 5,491,568 | 2/1996 | Wan ......................................... | 358/518 |

Primary Examiner—Edward L. Coles, Sr.
Assistant Examiner—Cheukfan Lee
Attorney, Agent, or Firm—Raymond L. Owens

[57] ABSTRACT

A method for transforming input color values of a digital image to produce suitable output color values for use by a particular device is disclosed. In this method a plurality of color transforms are stored, each such transform responds to input color values of a digital image and produces output color values which can be used by the particular device. In the method an intermediate transform which is user desirable for transforming the input color values is formed by interpolating between the plurality of transforms.

17 Claims, 8 Drawing Sheets

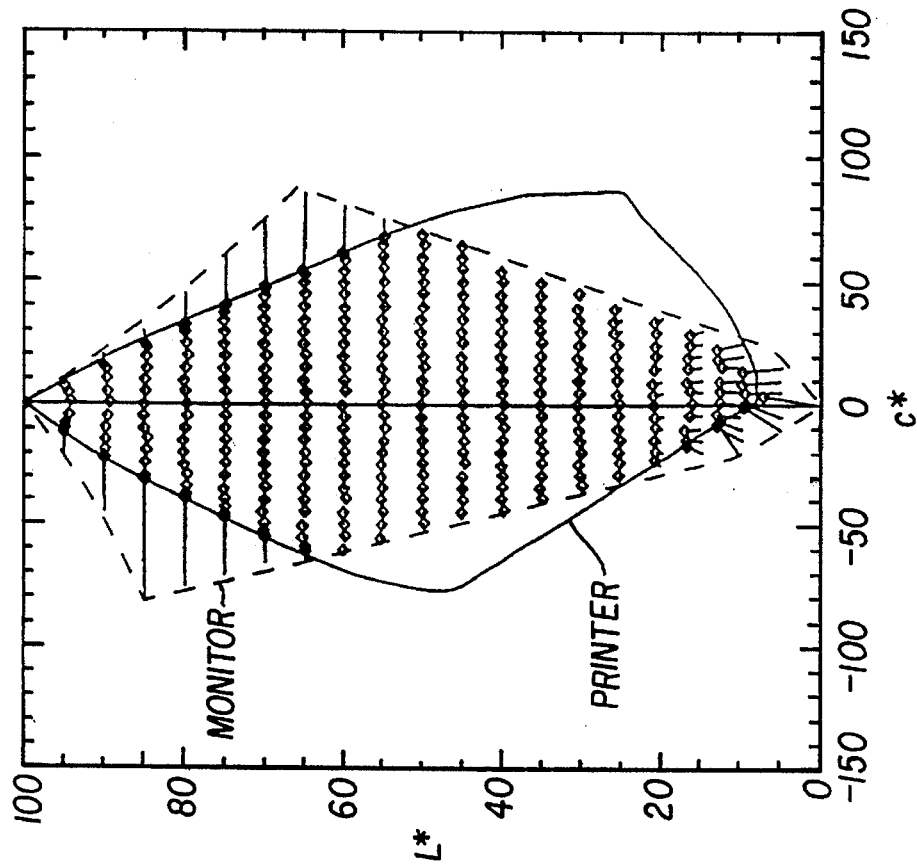
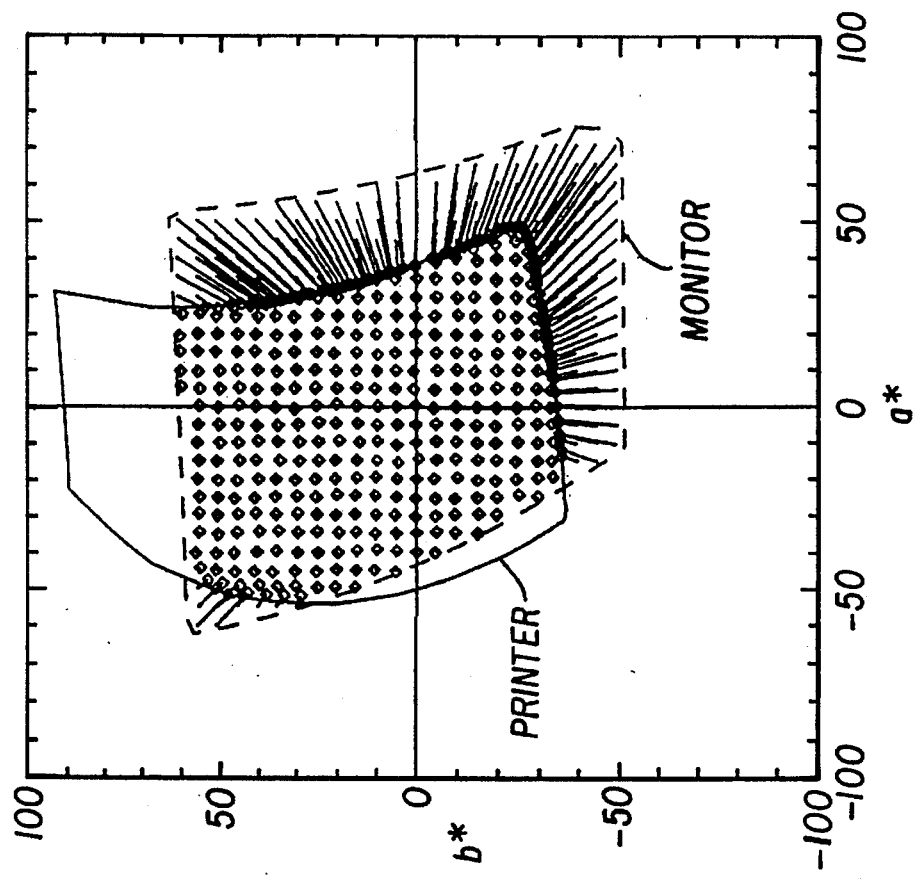
FIG. 10B
FIG. 10A

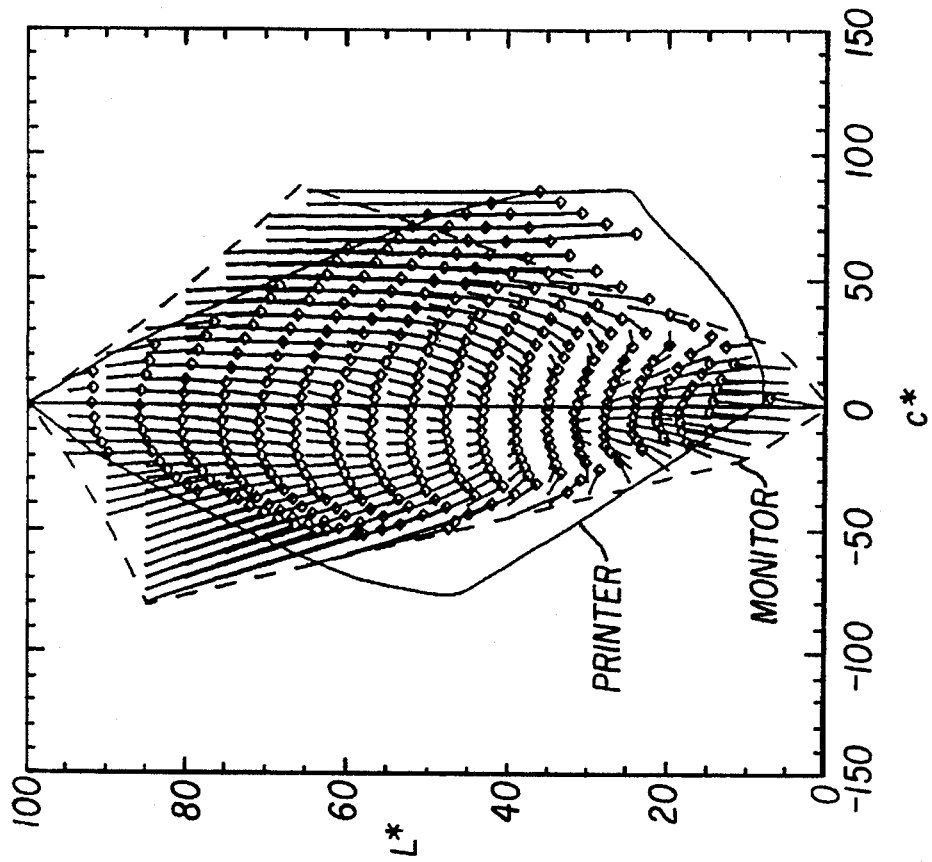
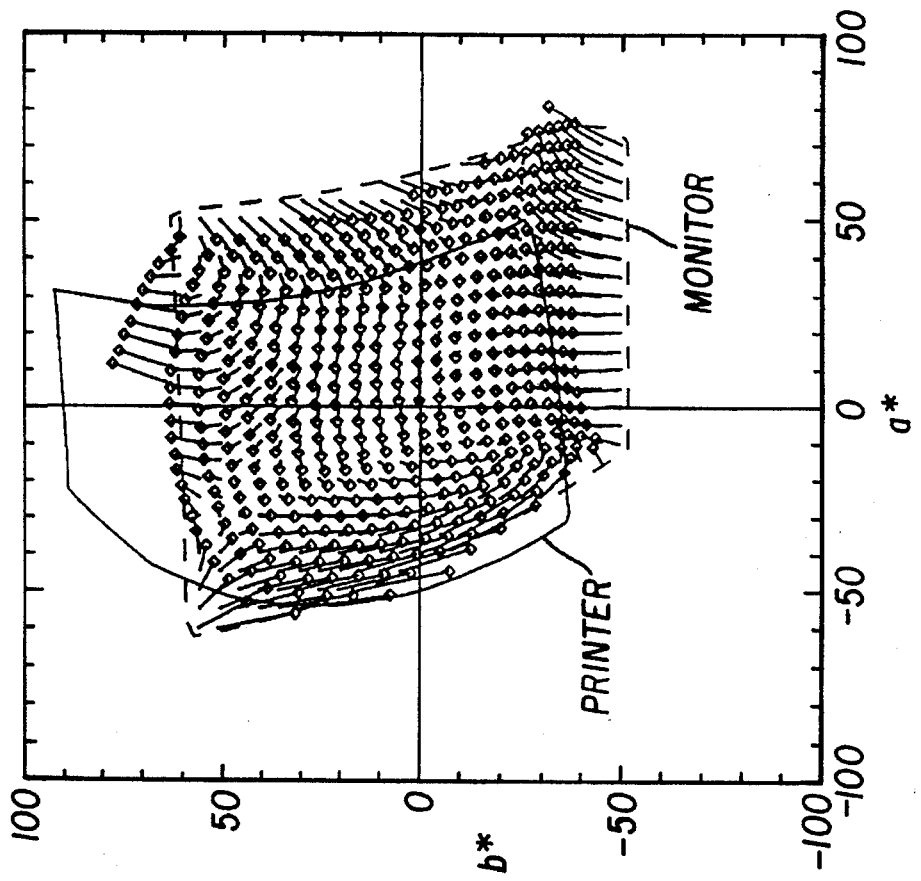
FIG. 11B
FIG. 11A

TRANSFORMING COLOR SIGNAL VALUES FOR USE BY A PARTICULAR DEVICE

FIELD OF THE INVENTION

The present invention relates to the field of color calibration for digital imaging systems and more particularly it relates to efficiently producing a more desirable color transform.

BACKGROUND OF THE INVENTION

A given digital color output device produces colors by varying the colorant levels of its associated colorants. For a subtractive device, such as most color printers and printing presses, these colorants are usually cyan, magenta, yellow, and sometimes black. For an additive device such as a typical video display these colorants are usually red, green, and blue.

The colors which can be reproduced on the device can be reached by varying each of the primary colorants between their minimum and maximum values. Typically the amount of each of the colorants is determined by a device control signal. A lattice of these device control signals is shown in FIG. 1 for a typical 3-color printer such as a thermal dye sublimation printer, or an ink-jet printer. Each of the dimensions of the lattice is associated with a different colorant. Any color which can be reproduced by the printer can be represented by a point within this lattice.

The device control values themselves do not contain any information about the color reproduction characteristics of the device without knowledge of the spectral characteristics of the colorants and the tone response of the device. Typically the color reproduction characteristics of a device are obtained by determining (theoretically or by measurement) the response of the device in some device-independent color space. FIG. 2 shows an example where the colors formed from the lattice of control values in FIG. 1 have been represented in the CIELAB device-independent color space.

The volume of colors which can be produced by the device is known as the color gamut. In general, each device will have a different color gamut associated with it. Furthermore, sending the same control signals to different devices will generally produce different colors. As a result, color transformations are often necessary to convert the color image data into a form which is appropriate for display/printing on a particular output device. The goal in this case is to convert the input color values into the device control signals which will produce the "desired color" on the selected output device. The definition of the desired color is often dependent on the image content, the intended use of the image, the color gamut of the specific display device, as well as on personal preference. Examples of typical color reproduction goals embodied in said color transformations would include forming a colorimetric match to accurately reproduce the colors produced on some reference display, producing an image with the most saturated colors possible, or producing an image with a "photographic" tone scale.

Because of the fact that different color reproduction goals may be desirable for different users, applications, and/or images, it is often necessary to provide a number of different choices to the user. For example, a printer may be supplied with a number of different color rendering options which can be specified by the user at print time. These choices would allow the user to select the option which gives the desired color mapping.

However, providing a discrete number of choices to the user is often a less than satisfactory solution. This is due to several reasons. First, the user may not be happy with any of the choices, but may desire a result which is intermediate to the available options. Second, adding more and more options will increase the complexity of the user interface which will make it more confusing, and therefore difficult to make the optimum choice.

Typically the color rendering options are implemented by storing a description of the transformations which must be applied to the color values for each choice. These transformations may be stored as one or a combination of color-correction matrices, 1-D Look-Up Tables (LUTs), 3-D LUTs, etc. Often the storage of these transformations may occupy a substantial amount of memory. This is particularly true for the case of the 3-D LUT which is becoming increasing common in its usage. The addition of color rendering options will therefore have an impact on the memory requirements of the device and/or the device driver software. Additionally, attempting to provide any large number of options will also have an impact on the device driver design and quality assurance process. As more color rendering options are added, the amount of development and testing time increases proportionally.

It can therefore be seen that there are two conflicting problems. First, the user often has a need for flexibility in the way an image is rendered to some particular device. This flexibility may require a large number of options to satisfy the needs of the large number of users, images, and applications. On the other hand, providing a large number of options to the user may be confusing to the average user, and additionally will have a negative impact on the memory requirements and development work needed effort for the device. This invention provides a way to simultaneously address both of these problems by providing a flexible, but simple user interface which is also easy to develop and implement, and has a minimum impact on the device memory requirements.

SUMMARY OF THE INVENTION

It is therefore an object of the invention to provide a method for efficiently producing a transform that is highly user desirable.

This object is achieved in a method for transforming input color values of a digital image to produce suitable output color values for use by a particular device, comprising the steps of:

(a) storing a plurality of color transforms, each such transform responding to input color values of a digital image and producing output color values which can be used by the particular device; and (b) interpolating between the plurality of transforms to produce an intermediate transform which is user desirable for transforming the input color values.

A continuous range of color rendering choices is provided for a digital color output device such as a printer or a CRT. The continuous adjustment is obtained by providing transforms for a small number of color transformations representing the extremes of the desired adjustment range and interpolating an intermediate transform based on a user-specified set-point.

Advantages

The present invention offers a user the feature of not needing to choose from a small number of color transformations. Also it provides the user with a more intuitive color transform selection process.

Another advantage of the present invention is that it can be used in a color display device without having to anticipate the plurality of preferences for different users of such device. Since the present invention employs an interpolation technique, it reduces the need for computer memory.

BRIEF DESCRIPTION OF THE DRAWINGS

FIGS. 10A and 10B depict color reproduction characteristics for predetermined colorimetric transform;

FIGS. 11A and 11B depict color reproduction characteristics for a second predetermined transform.

DETAILED DESCRIPTION OF THE INVENTION

Figure 1:
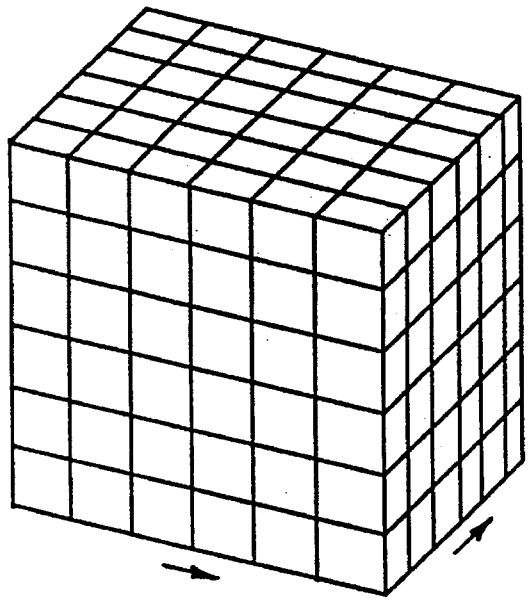
FIG. 1 depicts a lattice of control values for a subtractive color output device.
Figure 2:
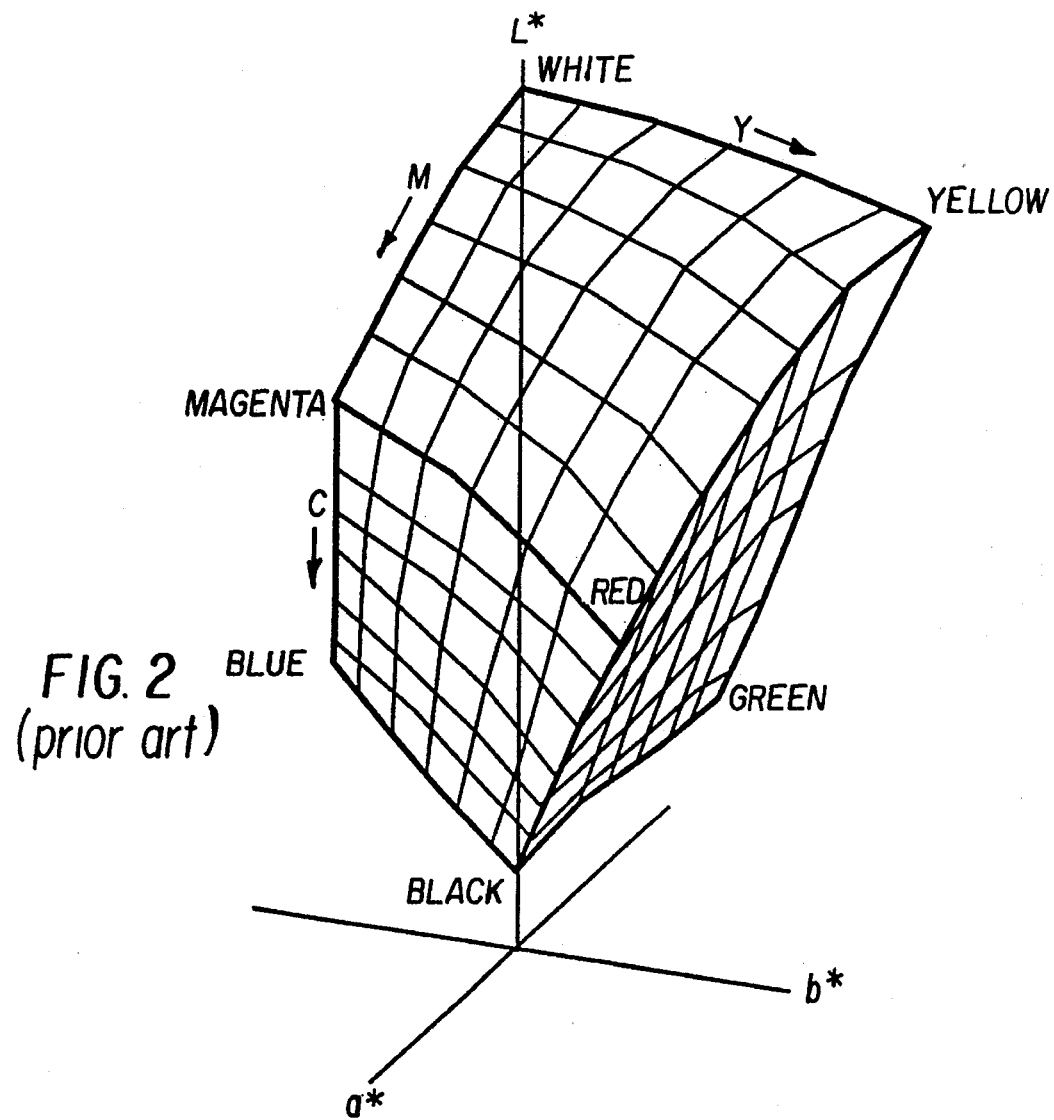
FIG. 2 depicts device-independent color representation of control value lattice.
Figure 3:
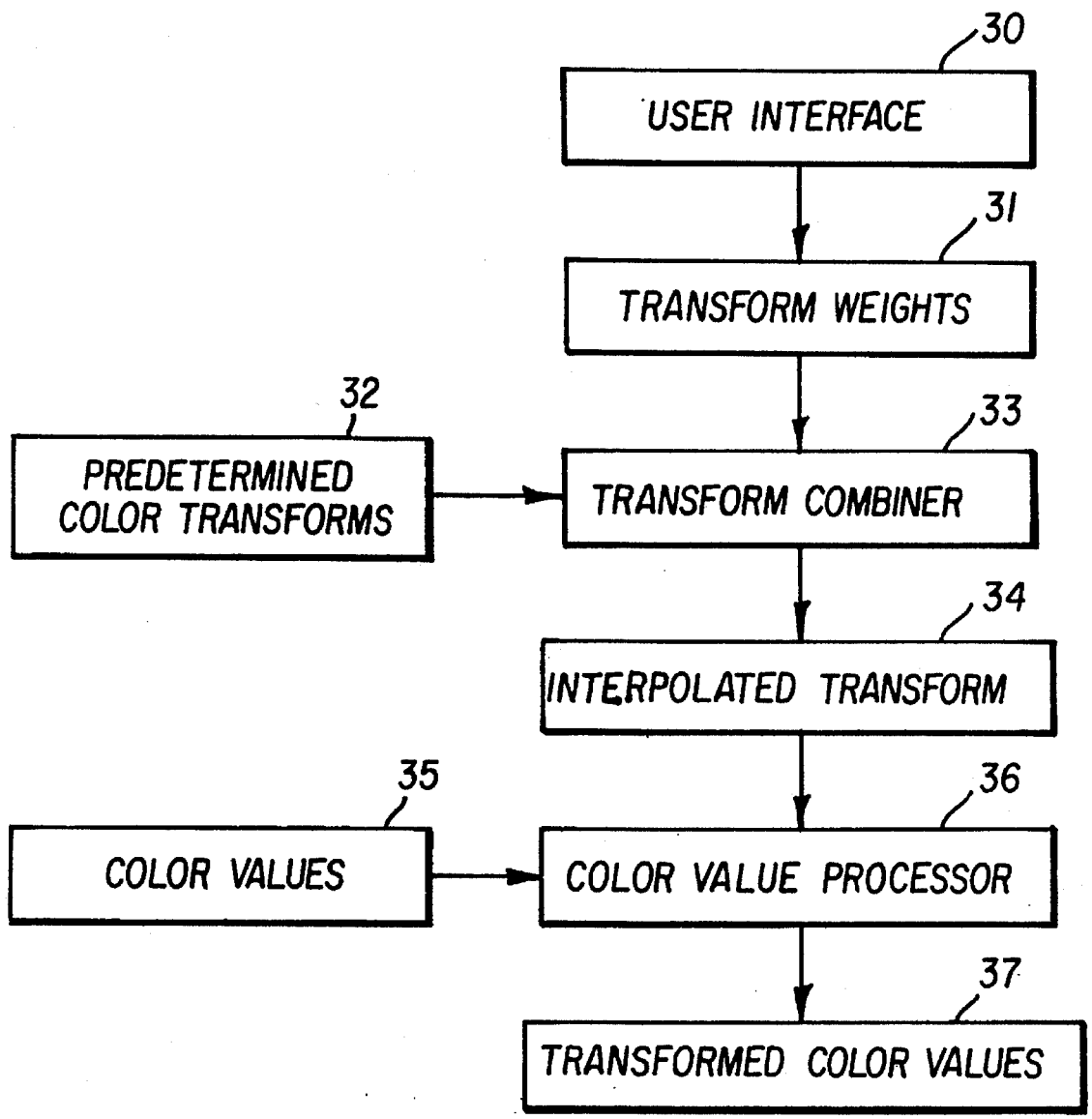
FIG. 3 depicts a system overview.

This invention relates to a method for providing a color transformation which can be continuously adjusted between a small number of predetermined color transformations which represent the extremes of the desired adjustment range. With reference to FIG. 3 it can be seen that the invention includes several parts: a user interface 30 which permits the user to adjust one or more "knobs" to specify the desired color transformation and produces a set of transform weights 31. A transform combiner 33 accepts the transform weights generated by the user interface and the predetermined color transforms 32, and forms an interpolated transform 34. A color valve processor 36 applies the interpolated transform to the color values 35 corresponding to the pixel values in a digital image to form transformed color values 37.

There are many forms that the user interface 30 can take. For example, consider the case where two predetermined color transforms were provided. The two transforms might represent a pair of different image contrast levels, a pair of different color saturation levels, or two completely unrelated tone reproduction aims. The task performed by the user interface is to permit the user to specify the transform weights for each transform to be used when combining the predetermined color transforms to determine the interpolated transform. The user interface could be as simple as permitting the user to directly enter the numerical values of the weights using a keyboard. However, a more "user-friendly" interface might use one of the approaches illustrated in FIG. 4. A slidebar 40 can be used to smoothly transition from the first predetermined transform (Transform 1) to the second predetermined transform (Transform 2). The user would choose the desired compromise between these transforms by using a track-ball, mouse, or cursor keys on a keyboard to move the slider 41 to the left or to the right indicating whether the transform should look more like Transform 1, or more like Transform 2. If the slider is moved all the way to the left, the user interface would return a weight of 1.0 for Transform 1, and a weight of 0.0 for Transform 2. Similarly, if the slider were moved all the way to the right, the user interface would return a weight of 0.0 for Transform 1, and a weight of 1.0 for Transform 2. Likewise, if the slider were in the middle a weight of 0.5 would be returned for both transforms.

A second type of slidebar 42 is also shown. Here the slider 43 can be either moved directly, or by the arrow controls 44 on either end of the slidebar. Another user interface would use a dial gauge 45 to indicate the desired transform weights. In this case the dial indicator 46 would be moved either clockwise or counter-clockwise to modify the transform. Yet another user interface would involve a series of check-boxes 47. The user would indicate the desired transform by checking the box 48 which is either closer to Transform 1, or Transform 2. In this case, only a discrete number of choices are allowed. These examples should be considered to be representative of possible user interfaces, but are by no means an exhaustive list.

Figure 5:
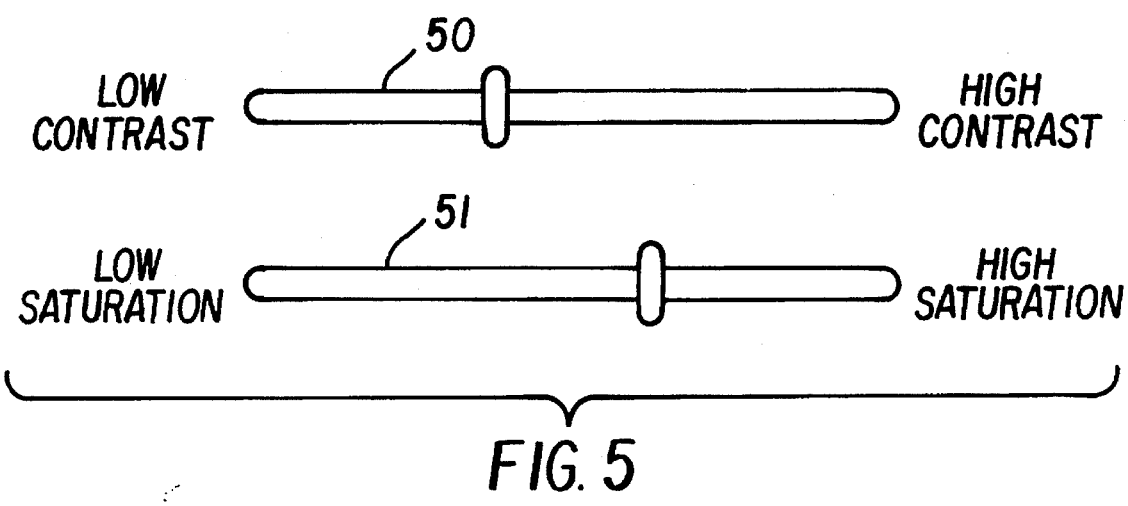
FIG. 5 depicts a typical user interface for two independent transform attributes.

When two independent image attributes are being controlled, a user interface can be provided for each attribute. For example, FIG. 5 shows a pair of slidebars to control the contrast and saturation level of the desired transform. One slidebar 50 controls the contrast level of the transform, while the other slidebar 51 controls the color saturation level. In this case, there would have to be more than just two predetermined transforms. One implementation would use four predetermined transforms. A transform for the lowest contrast level and the lowest saturation level, another transform for the lowest contrast level and the highest saturation level, a third transform for the highest contrast level and the lowest saturation level, and a fourth transform for the highest contrast level and the highest saturation level. The transform weights for the four predetermined transforms would be determined from the positions of the two slidebars. For example, the contrast slidebar 50 could produce a pair of weights $w_{lc}$ and $w_{hc}$ for the low and high contrast extremes, respectively. Likewise, the saturation slidebar 51 could produce a pair of weights $w_{ls}$ and $w_{hs}$ for the low and high saturation extremes, respectively. The transform weights for the four predetermined transforms could then be determined from the two pairs of weights as follows:

$$w_{lc,ls} = w_{lc} \, w_{ls}$$

$$w_{lc,hs} = w_{lc} \, w_{hs}$$

$$w_{hc,ls} = w_{hc} \, w_{ls}$$

$$w_{hc,hs} = w_{hc} \, w_{hs} \tag{1}$$

where the subscripts on the transform weights indicate which of the four predetermined transforms the weight applies to. This approach could easily be extended to the case where more than two attributes are being controlled. In general, there will be $2^N$ predetermined transforms, where N is the number of attributes.

In other cases, the predetermined transforms might not correspond to a number of independent attributes, but might correspond to different tone/color reproduction goals. For example, one goal might be a colorimetric reproduction of the image, another might be to match the appearance of a normal photographic print, and a third might be to print the most saturated colors possible. In this example, a user interface like that shown in FIG. 6 could be used to smoothly vary the interpolated transform between the three predetermined transforms. A triangular "slidebar" 60 is provided in which the user can position the slider 61. The distance between the slider and each of the three corners can then be used to determine the transform weights. If the slider were positioned exactly on one of the corners, the transform weight for that transform would be 1.0, and the weights of the others would be 0.0. Similarly, if the slider were positioned halfway along the connecting line between Transform 1 and Transform 2, each of those transforms would receive a transform weight of ½ and the transform weight for Transform 3 would be 0.0. Likewise, if the slider were positioned in the center of the triangle, each of the transforms would receive a weight of ⅓.

Figure 6:
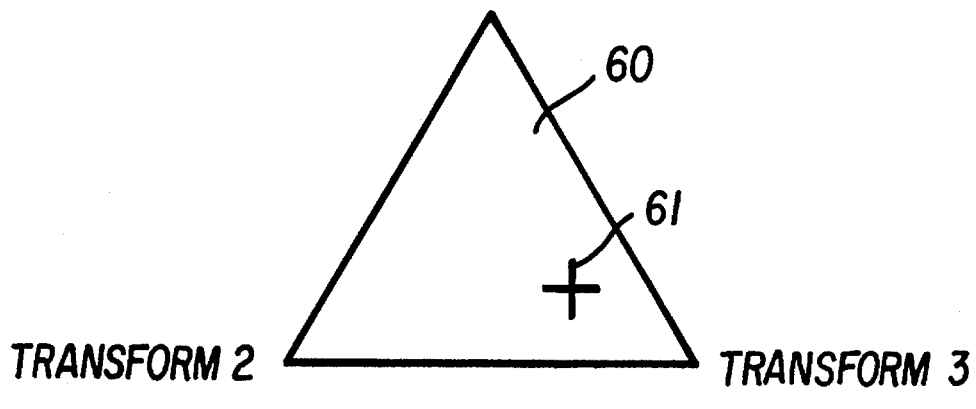
FIG. 6 depicts a typical user interfaces for three predetermined transforms.
Figure 7:
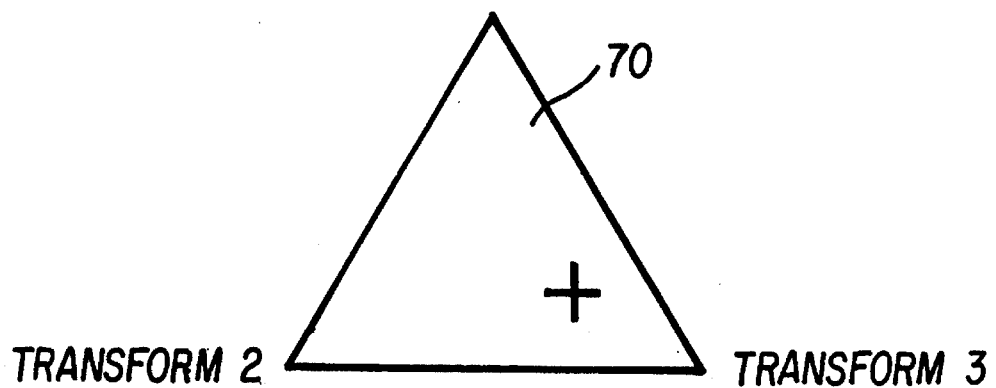
FIG. 7 depicts a typical user interface which combines three color reproduction strategies with a tone scale adjustment.
Figure 7:
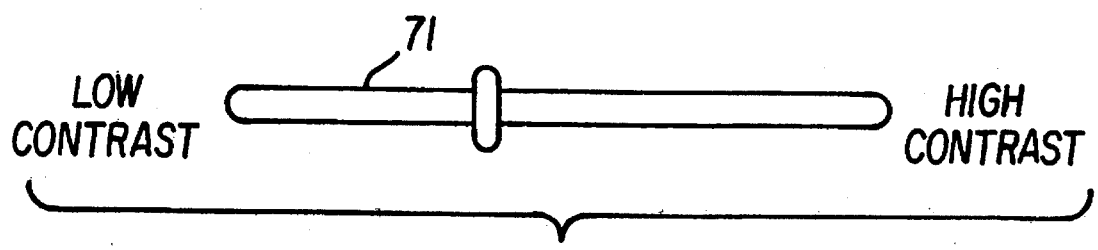

In some cases it may be desirable to combine the user interface shown in FIG. 6 with a second control which modifies an independent image attribute. For example, FIG. 7 illustrates a case where a triangular slidebar 70 is combined with a conventional slidebar 71. The triangular slidebar might be used to adjust the color reproduction characteristics, while the conventional slidebar might be used to adjust the contrast of the tone reproduction. In this example, the contrast adjustment might be accomplished by changing a set of 1-D LUTs which are applied prior to a 3-D LUT which would be used to implement the interpolated transform formed to accomplish the color reproduction adjustments. The adjustment to the 1-D LUTs might be accomplished by determining transform weights for two or more predetermined transforms, or a parameter might be generated which could be used in an equation to generate the desired 1-D LUTs. Examples of other independent attributes which could be adjusted in this manner would be brightness, and color balance.

Figure 8:
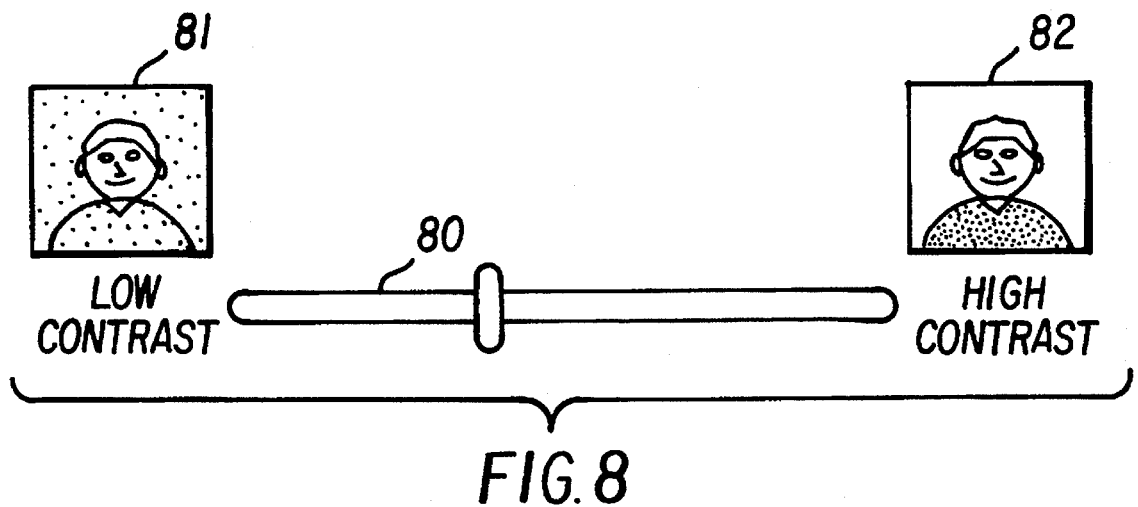
FIG. 8 depicts typical user interfaces previewing the predetermined transforms.

In many cases, it will be useful to incorporate a preview feature into the user interface to give the user an idea of the effect that adjusting the transform will have on his image. For example, FIG. 8 shows an embodiment of the present invention where a slidebar 80 is used to adjust the image contrast and preview images 81 and 82 are provided corresponding to the color reproduction associated with the predetermined transforms. Showing these preview images will give the user a visual representation of the effect generated by adjusting the transform weights. The preview images can be either a standard reference image, or possibly the actual image that the user is preparing to display/print. Since the user interface will typically be implemented on a video display, and the final output device will frequently be some other device, the previewed images may only be a simulation of the color reproduction which will be obtained on the actual output device. For example, since the gamuts of the video CRT and the output device are usually different, some of the colors that will be generated on the output device may be outside the color gamut of the video display.

Figure 9:
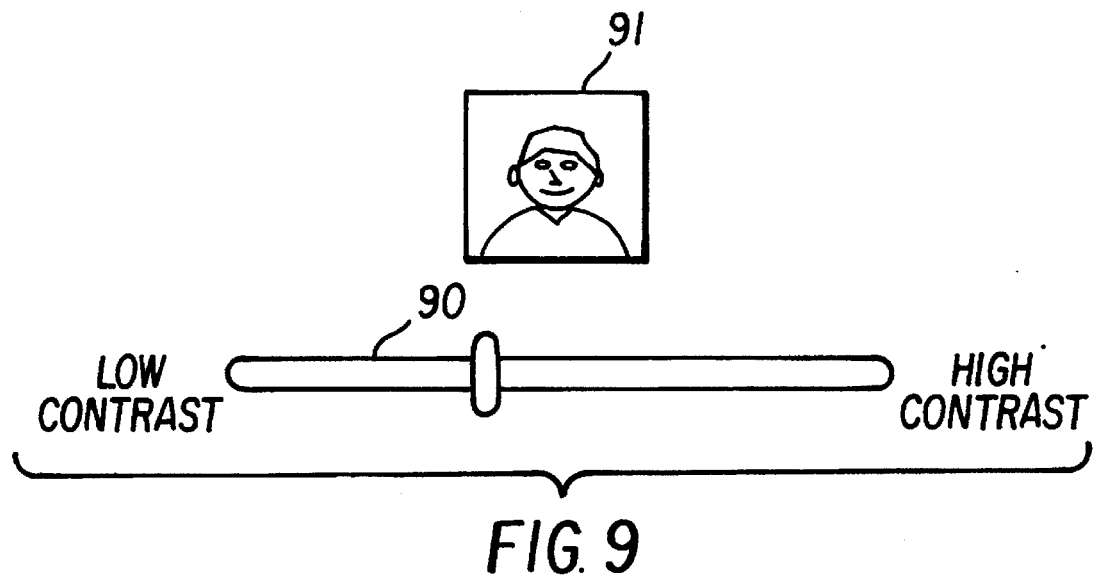
FIG. 9 depicts typical user interfaces having a preview feature.

Another form of image preview is illustrated in FIG. 9. In this case a preview image 91 is generated corresponding to the current setting of the slidebar 90. This has the advantage over the embodiment shown in FIG. 8 that the user can view the actual color reproduction characteristics directly rather than guessing at the characteristics based on only the endpoints. The disadvantage, however, is that a simulation of the interpolated transform must be calculated in real time. An alternate embodiment of this approach would be to update the image preview only when requested by the user.

Other examples of user interfaces could easily be envisioned to give the user other ways to control the weights, as well as handle other types/numbers of predetermined transforms. The examples given here should just be considered to be illustrative of the basic concept. The fundamental feature of all of these interfaces is that they allow the user to specify the transform weights for some number of predetermined transforms.

In accordance with this invention, the content of the image itself can be used to determine the transform weights which provide the most user desirable transformation. For example, the distribution of colors and brightness in the image can be determined, and this information used to estimate the optimum values for the various transform weights. The range of brightness in the image can be used to adjust the transform weights corresponding to an image contrast adjustment, or the maximum color saturation level can be used to adjust the transform weights corresponding to an image saturation adjustment. The estimated values can be used directly. Alternatively, they can provide initial positions for the slidebar positions presented to the interactive user interface.

In another feature, the user desirable transform weights are determined from information stored with the image data. Often this type of information is referred to as "image tags." For example, an image might be tagged to specify that the image should be rendered with the saturation adjustment at its 50% level. The image file containing this tag is then sent to a remote site for printing where the tag value would be interpreted and used to build the desired transform.

Once the transform weights have been determined, the next step in the process which was shown in FIG. 3 is the combining of the various predetermined transforms. The individual predetermined transforms might involve one or a combination of transform elements such as color-correction matrices, 1-D Look-Up Tables (LUTs), 3-D LUTs, etc. The transform combiner 33 has the job of interpolating between the predetermined transforms to form an interpolated transform 34. In the preferred embodiment of this invention, each of the predetermined transforms would be stored as a 3-D LUT having identical size and lattice indices. In this case, the interpolated transform could simply be determined by forming a weighted average of the predetermined transform values stored at each of the nodes of the 3-D LUTs.

As an example, consider the case where two predetermined transforms have been formed corresponding to different color reproduction strategies to be used to transform video RGB values to printer control values. FIGS. 10A and 10B show an example of a predetermined transform which corresponds to a "colorimetric reproduction." FIG. 10A shows a slice through CIELAB space at a $L^*$ value of 65, and FIG. 10B shows a vertical slice through CIELAB space at a hue angle of 330°. The dashed curve represents the boundary of the color gamut for the video display, and the solid curve represents the boundary of the color gamut for the output printer. The vectors in these plots represent the color difference between the input and output color values introduced by the transform for each of the colors in that slice. The tails of the vectors represent the color values for the input video display. The heads of the vectors (corresponding to the diamond symbols) represent the color values for the output printer. It can be seen that for this colorimetric transform, the vectors have zero length for the input colors inside the output gamut, and that for input colors outside the output gamut the hue angle and $L^*$ value is preserved and the C* value is clipped. (C* is a measure of the saturation of the color and is given by: $C^*=\sqrt{a^{*2}+b^{*2}}$). This type of a transform would typically be implemented as a 3-D LUT where the printer control values needed to produce the appropriate color is stored for each node in a lattice of input video RGB values.

FIGS. 11A and 11B show an example of a second predetermined transform which maps the most saturated input colors to the most saturated output colors. In this case, it can be seen that the saturation of the reproduced colors corresponding to the most saturated input colors is much higher than with the colorimetric transform shown in FIGS. 10A and 10B, but that there are larger errors associated with the input colors which are inside the output gamut. This transform could be implemented as a set of 1-D LUTs, but for purposes of combining it with the other predetermined transform, it has been implemented using a 3-D LUT having the same lattice as that used in the transform of FIGS. 10A and 10B.

Figure 4:
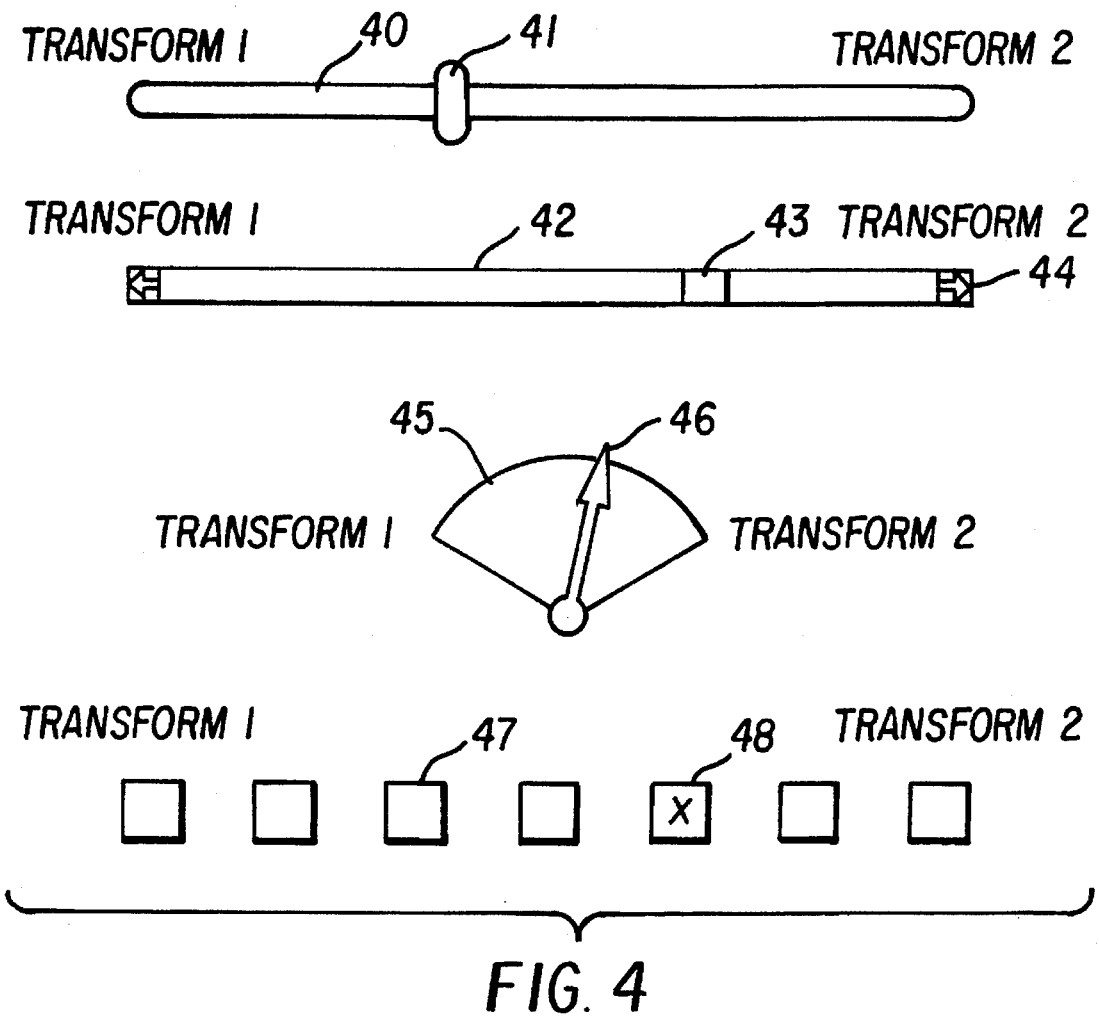
FIG. 4 depicts typical user interfaces for two predetermined transforms.
Figure 12B:
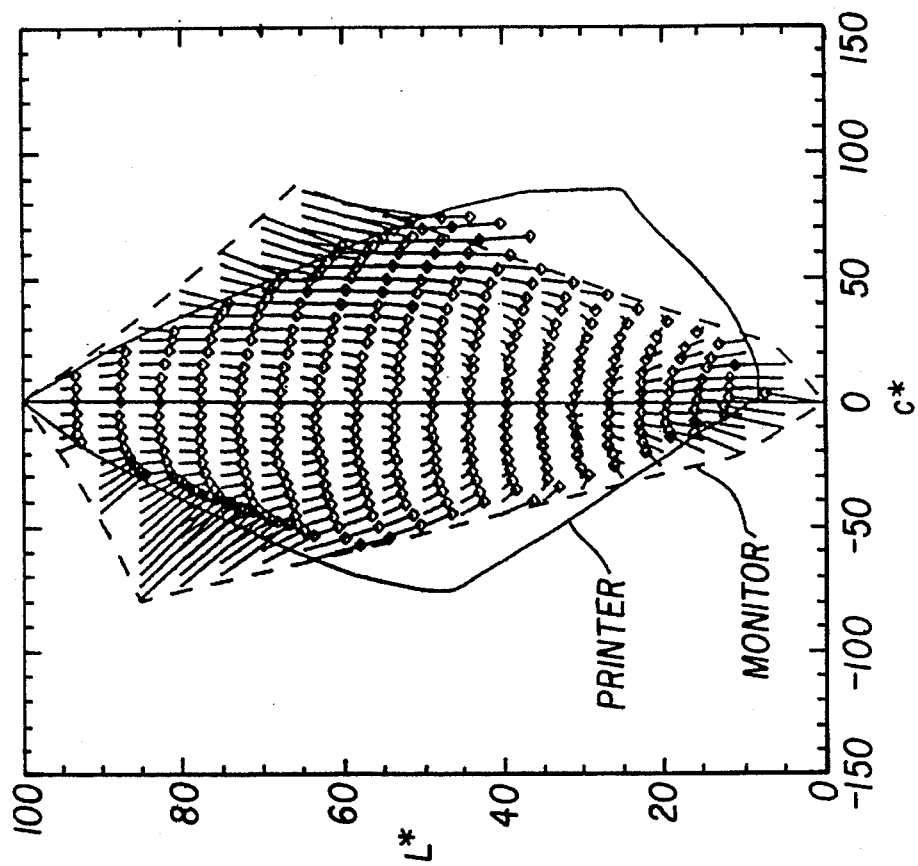
FIGS. 12A and 12B depict color reproduction characteristics for interpolated transform.
Figure 12A:
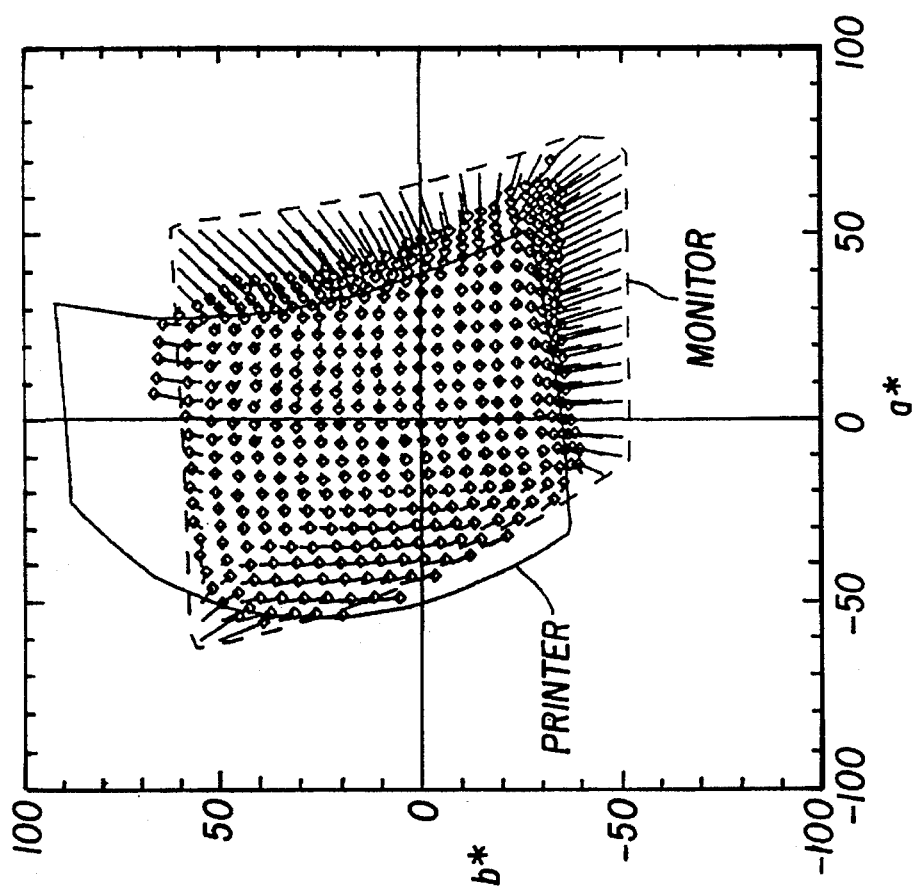

If a user interface like one of those shown in FIG. 4 were used where the transform of FIGS. 10A and 10B were used for Transform 1, and the transform of FIGS. 11A and 11B were used for Transform 2, it is then possible for the user to specify a compromise color reproduction strategy intermediate to the two predetermined transforms. For example, if the user were to choose a slider position halfway between the two extremes, the transform shown in FIGS. 12A and 12B would result. It can be seen that this transform is indeed intermediate to the two transforms shown in FIGS. 10A and 10B and FIGS. 11A and 11B. The reproduction of the in-gamut colors is less accurate than that in FIGS. 10A and 10B, but more accurate than that in FIGS. 11A and 11B. Likewise, the reproduced saturation of the out-of-gamut colors is higher than that in FIGS. 10A and 10B, but less than that in FIGS. 11A and 11B.

In other embodiments of this invention where all of the predetermined transforms consisted of identical transform elements, a similar weighted average approach could be used. For example, if each of the predetermined transforms consisted of a set of 1-D LUTs, a weighted average of the LUT values could be performed. In other cases where the transforms were allowed to have different forms, the transforms could be combined by first converting each of the predetermined transforms into a common form and then performing a weighted average. For example, if a first one of the predetermined transforms consisted of a color-correction matrix, and a second one of the predetermined transforms consisted of a 3-D LUT, the first predetermined transform could be evaluated at each of the lattice indices of the 3-D LUT used in the second transform to form a new first predetermined transform. The new first predetermined transform could then be combined with the second predetermined transform using a simple weighted average approach.

Once the interpolated transform 34 is determined, the color value processor 36 can then be used to process any number of input color values 35 to determine the transformed color values 37. Typically the input color values will correspond to the pixels which make up a digital color image, but in general they can consist of any list of input color values. The color value processor might be implemented inside of the printer hardware, in the printer driver software, or anywhere else that color values might reside. The transformed color values which are computed can be output by the printer, or can be stored for later display and/or manipulation.

The invention has been described in detail with particular reference to certain preferred embodiments thereof, but it will be understood that variations and modifications can be effected within the spirit and scope of the invention.

PARTS LIST 30 user interface
31 transform weights
32 predetermined color transforms
33 transform combiner
34 interpolated transform
35 color values
36 color value processor
37 transformed color values
40 slidebar
41 slider
42 slidebar
43 slider
44 arrow controls
45 dial gauge
46 dial indicator
47 check-boxes
48 checked box
50 slidebar
51 slidebar
60 slidebar
61 slider
70 slidebar
71 slidebar
81 preview image
82 preview image
90 slidebar
91 preview image

We claim:

1. A method for transforming input color values of a digital image to produce suitable output color values for use by a particular device, comprising the steps of:
   (a) storing a plurality of color transforms, each such transform responding to input color values of a digital image and producing output color values which can be used by the particular device; and
   (b) interpolating between the plurality of transforms to produce an intermediate transform which is user desirable for transforming the input color values to produce output color values which can be used by the particular device.

2. The invention as set forth in claim 1 wherein further including storing the transforms in multidimensional lookup tables and further wherein the interpolating step includes forming the intermediate transform from a weighted average of coefficients stored in the multidimensional lookup tables.

3. The invention as set forth in claim 1 wherein the interpolating step includes interactively determining the interpolation position of the user desirable intermediate transform.

4. The invention as set forth in claim 3 wherein there are two transforms with different color reproduction characteristics and wherein the color interpolating step uses a slide bar process to specify the user desirable interpolation position which is used in producing the transform intermediate to the two transforms.

5. The invention as set forth in claim 3 wherein there are three transforms with different color reproduction characteristics and wherein the color interpolating step uses a triangular slide bar process to specify the user desirable interpolation position which is used in producing the transform intermediate to the three transforms.

6. The invention as set forth in claim 1 wherein one or more of the transforms are selected from the group consisting of:

(i) a colorimetric transformation which accurately reproduces the input colors;

(ii) a transformation which produces the most saturated colors; and (iii) a photographic tone scale reproducing transform.

7. The invention as set forth in claim 1 wherein the interpolation position of the user desirable intermediate transform is determined from the distribution of the input color values contained in the digital image.

8. The invention as set forth in claim 1 wherein the interpolation position of the user desirable intermediate transform is determined from image tags stored with the digital image.

9. A method for transforming input color values of a digital image to produce suitable output color values for use by a particular device, comprising the steps of:

(a) storing between two to four color transforms in multidimensional lookup tables, each of such transforms being adapted to respond to input color values of a digital image and produces output color values which can be used by the particular device; and (b) interpolating between the plurality of transforms to produce an intermediate transform which is user desirable for transforming the input color values to produce output color values which can be used by the particular device.

10. A method for transforming input color values of a digital image to produce suitable output color values for use by a particular device, comprising the steps of:

(a) storing between two to four color transforms, each of such transforms being adapted to respond to input color values of a digital image and produces output color values which can be used by the particular device; and (b) interpolating between the plurality of transforms to produce an intermediate transform which is user desirable for transforming the input color values including:
 (i) selecting a position intermediate between the transforms; and
 (ii) based upon the selected position generating weighting values which are used for producing the intermediate transform which produce output color values which can be used by the particular device.

11. The invention as set forth in claim 10 wherein further including storing the transforms in multidimensional lookup tables and further wherein the interpolating step includes forming the intermediate transform from a weighted average of coefficients stored in the multidimensional lookup tables.

12. The invention as set forth in claim 10 wherein the interpolating step includes interactively determining the interpolation position of the user desirable intermediate transform.

13. The invention as set forth in claim 10 wherein the interpolation position of the user desirable intermediate transform is determined from the distribution of the input color values contained in the digital image.

14. The invention as set forth in claim 10 wherein the interpolation position of the user desirable intermediate transform is determined from image tags stored with the digital image.

15. The invention as set forth in claim 10 wherein there are two transforms with different color reproduction characteristics and wherein the color interpolating step uses a slide bar process to specify the user desirable interpolation position which is used in producing the transform intermediate to the two transforms.

16. The invention as set forth in claim 10 wherein there are three transforms with different color reproduction characteristics and wherein the color interpolating step uses a triangular slide bar process to specify the user desirable interpolation position which is used in producing the transform intermediate to the three transforms.

17. The invention as set forth in claim 10 wherein one or more of the transforms are selected from the group consisting of:

(i) a colorimetric transformation which accurately reproduces the input colors;

(ii) a transformation which produces the most saturated colors; and (iii) a photographic tone scale reproducing transform.

\* \* \* \* \*